May 25, 1971  O. MIDDLEBROOKS  3,579,717
APPARATUS FOR PELLETIZING CARBON BLACK
Filed Aug. 28, 1968
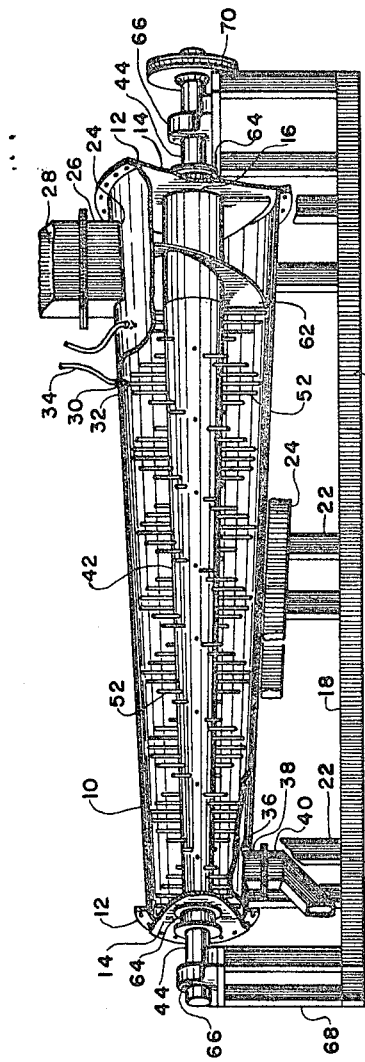
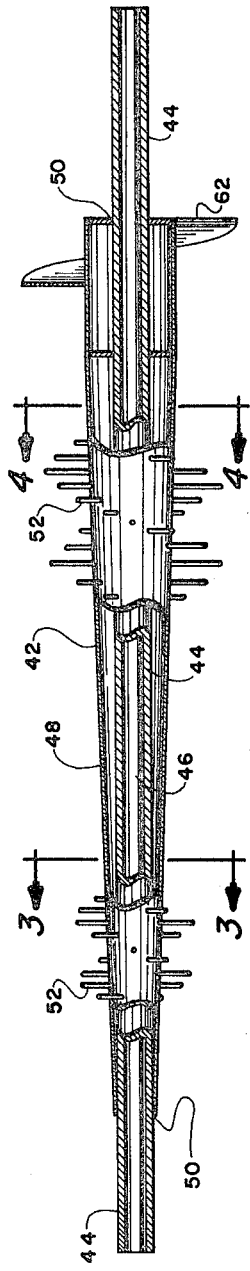
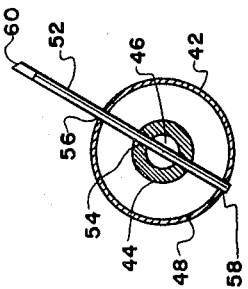
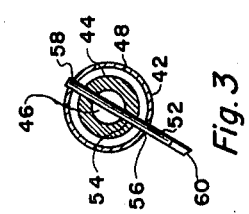
OLLIE MIDDLEBROOKS
INVENTOR.
BY *L. David Grapnell*
ATTORNEY United States Patent Office 3,579,717
Patented May 25, 1971

3,579,717
APPARATUS FOR PELLETIZING CARBON BLACK
Ollie Middlebrooks, Houston, Tex., assignor to
Continental Carbon Company, Houston, Tex.
Filed Aug. 28, 1968, Ser. No. 755,909
Int. Cl. B29b 5/00; C09c 1/58; B29c 23/00
U.S. Cl. 18—1                                    11 Claims

ABSTRACT OF THE DISCLOSURE

Finely divided solid carbon black is wet pelletized introducing the carbon black and the wet pelletizing liquid into a pelletizing or pelleting apparatus for mixing, agglomerating and pelletizing the black and liquid into pellet form. The pelletizing apparatus is an elongate truncated conical housing rigidly mounted with the axis being in a substantially horizontal plane. The housing has a gradually reduced diameter between its enclosed ends, accordingly being of tapered configuration. The housing has inlet means for introduction of the black and liquid near one end, and an outlet means for the discharge of pellets at the other end. An agitator means comprising a rotatable and axially mounted member having rigidly mounted pins extending from said member to about the interior of the pelletizer housing is mounted within said housing and is connected to a drive means.

BACKGROUND OF THE INVENTION

Field of the invention

This invention relates to apparatus for pelletizing carbon black and other materials in a finely divided condition to convert the black from essentially a flocculent powder to a solid, spherical product.

Carbon black is presently produced for the most part by the thermal decomposition or cracking of hydrocarbon feedstocks, such as aromatic streams having substantial carbon content, to carbon and combustion products by injecting the hydrocarbon feedstock, fuel gas and air into a furnace or reactor. The elevated temperature conditions of the reactor dissociate the feedstock into carbon black which occurs in the form of an aerosol or gas stream with particles of carbon black suspended therein. The reaction products are cooled to terminate the carbon black forming reaction, and the black particles are separated from the gas stream in the form of loose, fluffy carbon black.

This unconsolidated black in the form of finely divided particles must be pelletized to place the same in condition for transportation and handling by the end user. Of the pelletizing systems available, the same are generally characterized as being either dry or wet, and the present invention is directed with this wet pelletizing system. In the wet pelletizing system, the finely divided black particles are introduced into the pelletizing apparatus in conjunction with a pelletizing liquid or liquids, either water or a hydrocarbon, and the resultant mixture of liquid and black is converted by agitation to wet carbon black pellets.

The wet pelletizing is conventionally accomplished in a pelletizing apparatus which comprises an elongate, uniform cylindrical pelletizing box or chamber closed at both ends with a feed and discharge openings at opposite ends. Within such pelletizer, a coaxial shaft having a series of radially projecting elements or pins is rotatably mounted to apply the necessary agglomerating forces to the finely divided solids after the solids are wetted with the pelletizing liquid. The present invention is concerned with the apparatus for treatment of finely divided carbon black to accomplish the formation of pellets utilizing a wet pelletizing system.

Description of the prior art

The apparatus for wet pelletizing carbon black and other finely divided solids disclosed in the prior art teachings is basically an elongate, uniform cylindrical pelletizing chamber mounted stationarily with the axis in a substantially horizontal plane, said chamber having rotatable agitating elements disposed therein. The chamber is enclosed at both ends and provided with an axial rotatable shaft carrying a series of radially projecting pins, said chamber having an inlet for water or other wetting agent, means for supplying flocculent black to the cylindrical chamber and means for removing the formed wet pellets prior to transmitting the pellets to be dried in a rotating dryer drum, or an equivalent drying means.

The basic pelletizing apparatus described is capable of incorporation into a system whereby multiple pelletizing units are used in series or parallel layout in the conventional carbon black manufacturing equipment train. The basic apparatus can be improved in some instances by the application of coating materials to the equipment within and the interior of the pelletizing chamber to prevent caking, adherence and plugging.

The wet pelletizing equipment has also been altered by the refinement of the agitator element or pin by adjusting the shape of the pins, the composition of the pins, the coating of the pins, and the patterns in which the pins are placed along the axial mounting element. Additionally, the pins have been mounted on shafts of various materials and the pins have also been mounted on a cylindrical drum axially disposed about the central shaft within the pelletizer.

The pelletizing apparatus is inclusive of means for injecting aqueous liquids, hydrocarbon liquids or combinations of the same in order to provide the appropriate wetting agent for the black. Additionally, additive injection means are included in order to provide for the introduction of materials capable of modifying the physical characteristics of the pellet or the surface properties of the black, such as wetting agents, binder materials and the like.

The pelletizing apparatus has been subjected to extensive application of control equipment in order that the deisred amounts of the carbon black and wetting agent are introduced into the pelletizing operation. These controlled elements incorporate automatic weighing means, means for measuring the action of the pelletizer such as work input based on resistance measurements, and various other sensing devices. These references are directed to controlling the ratio of solids and pelletizing liquid introduced into the pelletizing chamber in order to obtain pellets of uniform size and density. The application of work to the mixture of black and liquid within the pelletizing chamber is additionally controlled by the use of variable speed drive equipment for adjustment in response of the pellet output.

SUMMARY

The invention of the present application is directed to an apparatus for wet pelletizing finely divided solids comprising a stationary truncated conical housing having centrally apertured end plates enclosing each end of the housing. The housing has a solids inlet port in the upper side near the upstream end having the greater diameter, an outlet port in the lower side of the housing near the downstream end having the lesser diameter, and at least one liquid spray port in the upper side of said housing near the upstream end. There is coaxially disposed through said housing a rotatable agitator extending through the apertures of the end plates, and a drive means communicates with the agitator means for rotating the same.

BRIEF DESCRIPTION OF THE DRAWINGS

FIG. 1 represents a side elevation partially in longitudinal section, illustrating an apparatus of the present invention;

FIG. 2 represents a detailed side elevation in longitudinal section of one element of FIG. 1;

FIG. 3 represents a cross sectional view of a portion of the apparatus on line 3—3 of FIG. 2; and FIG. 4 represents a cross sectional view of another portion of the apparatus on line 4—4 of FIG. 2.

DESCRIPTION OF THE PREFERRED EMBODIMENT

The present invention may be more readily understood from the following detailed description of the novel apparatus, taken in conjunction with the drawings. Referring more particularly to FIG. 1 of the drawings of the wet pelletizing apparatus, the numeral 10 designates generally the truncated conical housing which is adapted at each of its end with flanges 12 to which are affixed end plates 14. The end plates 14 are adapted to enclose the housing 10 and each end plate has a central aperture 16 therein.

The housing and the various auxiliary equipment comprising the complete pelletizing apparatus of the present invention are mounted in a stationary manner on a frame generally designated as 18 which is comprised of a base member 20, vertical support members 22 and the lateral support member 24 adapted to be affixed to the exterior of housing 10.

The truncated conical housing 10 is provided at its upstream end, which is the end having the larger diameter and being on the right hand side of FIG. 1, with a solids inlet port 24 through the upper side of housing 10. The inlet port communicates with a solids inlet means 26 and a solids feed conduit 28 which in turn communicates with a source of carbon black or other finely divided solids not shown in the drawings. Additionally, the housing 10 has through the upper side one or more liquid spray ports 30 at the upstream end of the housing in which there are affixed liquid spray nozzles 32 which are connected to liquid conduits 34 which in turn communicate with a source of wet pelletizing liquid not shown in the drawings. At the other end of housing 10, which is considered herein to be the downstream having the lesser diameter and appearing at the left hand side of the FIG. 1, there is a pellet outlet port 36 extending through the lower side of housing 10. This port has affixed thereto a pellet discharge means 38 which in turn communicates with a pellet discharge conduit 40 whereby the wet pelletized product is recovered from the wet pelletizing apparatus after completion of the pelletizing operation. The wet pellets of carbon black and pelletizing liquid are transmitted to an additional processing step of drying in a drying facility, not shown.

In the event the wet pelletizing operation to be conducted in the apparatus described requires the inclusion of an additive material in addition to the solids and wet pelletizing liquid, the additive material can be injected through a liquid spray nozzle 32 in combination with the wet pelletizing liquid, or there can be a separate inlet port and nozzle arrangement emplaced in the housing equivalent to port 30 and nozzle 32 in order that the additive can be introduced into the interior of housing 10.

The housing of the pelletizing apparatus of the present invention, as noted, is adapted to accommodate through its end plates 14, a rotatable agitator means which extends coaxially through the housing and apertures 16 of the end plates 14, said agitator means being generally designated 42. The agitator means 42 is made up of a coaxial member 44 of circular cross section, which is illustrated in the drawings more completely in FIG. 2 through 4.

Referring to FIG. 2, the agitator means 42 comprises a shaft 44 having an axial aperture 46 extending through its lengths, said shaft 44 having a uniform diameter. There is rigidly affixed about coaxial member 44, a sleeve member 48 which has a uniformly increasing diameter from the downstream end of housing 10 through the upstream end of housing 10 substantially proportionate to the increased diameter of housing 10 over the same distance. The sleeve member 48 is affixed to coaxial member 44 by sleeve welds 50 or other suitable means.

In addition to the arrangement of elements illustrated by coaxial member 44 with the axial aperture 46 and sleeve member 48, the rotatable agitator means 42 can be comprised of a solid shaft having an equivalent size and configuration as the combination of member 44 and sleeve 48. Additionally, the agitator means 42 can be a coaxial member extending through housing 10 and having a diameter comparable to the diameter of the downstream end of member 44.

In one preferred embodiment of the present apparatus, a housing 10 having a length of ten feet was provided with an interior diameter at is upstream end of twenty-eight inches, and an interior diameter at its downstream end of sixteen inches. Disposed within this apparatus was a rotatable agitator means 42 comparable to that illustrated in the drawings wherein the coaxial member 44 at the upstream end of housing 10 had an outside diameter of ten inches and at the downstream end of housing 10 had an outside diameter of four inches. These measurements are presented by way of illustration only and are not intended to establish limits on the invention.

The relative dimensions of the wet pelletizing apparatus have been determined to have certain optimum ranges from the standpoint of the size of the interior cross section of the housing member, said ranges being determinable on the basis of the quality of the pellets desired and the dry densities of the black as introduced into the pelletizer and the carbon black pellet as removed from the pelletizer and dried. The relationship is that the ratio of the effective cross sectional area at the upstream to the corresponding downstream end of the housing is inversely proportional to the ratio of the dry density of the black as introduced to the dry density of the black recovered i.e., a larger diameter at the upstream end where the loose black has the lowest density, and vice versa. Therefore, in the embodiment described above wherein the housing has a length of ten feet and diameters of twenty-eight inches and sixteen inches enclosing an interior tapered agitator means with respective diameters of ten inches and four inches. The specific dimensions for a particular wet pelletizing apparatus, while applying the foregoing teaching, must obviously be determined by the particular pellet qualities desired to be obtained from the wet pelletizing apparatus.

The rotatable agitator means 42 has a series of pins 52 extending from the surface of means 42, said pins terminating in the area of the inner periphery of the truncated conical housing 10. These pins 52 are illustrated in FIG. 1 as extending radially from means 42 in a helical pattern thereabout whereby upon rotation of the means 42, the materials within housing 10 are moved from the inlet to the outlet ports of the housing. The particular number of pins and geometrical arrangement thereof is not to be limited to the secific helical arrangement illustrated.

Referring more particularly to FIGS. 3 and 4, the preferred means of affixing pins 52 to the rotatable agitator means 42 is illustrated in detail. The coaxial member 44 has a series of ports 54 extending therethrough and the sleeve member 48 has a series of sleeve ports 56 extending therethrough, both of such ports 54 and 56 being adapted to receive pins 52. The pins are inserted to extend through the sleeve 48 and member 44 at one side, axial aperture 46, and then member 44 and sleeve 48 at the opposite side wherein the pin is affixed by a pin seal weld 58, or other suitable means. Pins 52 are conventionally provided with a beveled portion 60 at the exterior end thereof.

Referring again to FIG. 1, additionally there is mounted upon rotatable agitator means 42 a helicoid member 62 about the upstream end to assist in the movement of the materials through the housing 10.

The spacing of the pins 52 and the helicoid member 62 in relation to the inner periphery of housing 10 is critical from the standpoint of the quality and uniformity of the wet pellets produced by the apparatus. Generally the tolerance for clearance between these elements and the inner surface of the housing is in the order of 1/16 to 1/2 inch preferably.

The agitator means 42 is described as having a uniform diameter and circular cross section throughout its length, or alternatively said means can have a diameter of uniform variance and circular cross sectional area conforming to the diameter of the housing 10, that is decreasing in diameter from the upstream end to the downstream end of the housing. Further agitator means 42 is not necessarily tapered in conformance with the housing 10 over its entire length. In utilizing a member-sleeve arrangement similar to that illustrated in the drawings, a diminishing diameter over the upstream two-thirds of the length of the agitator means with a constant diameter thereafter provided satisfactory operations.

The rotatable agitator means 42 extends beyond the interior of housing 10, as shown by coaxial member 44, with said member being provided with a packing means 64 at each end in communication with the central apertures 16 for the purpose of maintaining the housing 10 in an enclosed condition. The coaxial member 44 extends at each end through the packing means 64 to be enclosed in a roller bearing block 66, or other suitable retaining means fixed or adjustable in nature, which is supported by bearing block support member 68 rigidly affixed to frame 18.

The rotatable agitator means 42 is provided with a suitable drive means, not specifically shown in the drawing. The drive can be transmitted to coaxial member 44 at one or both ends by means of a drive sheave 70 as an example. It is also within the scope of the invention to affix the coaxial member 44 to a direct drive means, rather than to utilize the sheave and belt system communicating with the drive motor. The drawings indicate the drive mechanism affixed at the upstream end of the means 42; however, it is anticipated that the drive means could be affixed to both ends or the downstream end of member 44.

The agitator means 42 can be arranged so that the member 44 may be released from the roller bearing block 66 temporarily in order that the means 42 may be inserted or withdrawn to the degree desired from the housing 10. This adjustment provides a means of controlling the tolerance or clearance of pins 52 and the inner periphery of housing 10.

The interior portion of housing 10 and the various components contained therein, such as pins 52 and agitator means 42, can be subjected to coating with various materials, such as rubber, plastics or paints to prevent the black and liquid from caking or plugging action within the apparatus.

The apparatus of the present invention can be utilized in conjunction with the conventional control equipment applied in this field without departing from the scope of the invention. The drive means can be provided with gears and other means of varying the speed of rotation of the means 42. The drive means can be provided with sensors to develop the work input as a source of information for controlling the pelletizing operation. Automatic weighing means can be used in conjunction with feeding the materials to the wet pelletizer and the control of the feeds can be connected by various sensing and transmitting means with the means 42, drive means, and analysis of product.

The apparatus of the present invention can be used singly or in multiple unit arrangements connected in parallel for the processing of materials. Additionally, it is anticipated that a housing section can be provided by insertion at either end of the housing 10, said added section, however, having a uniform diameter or a continuing geometric configuration corresponding to housing 10.

The apparatus of the present invention can be utilized to wet pelletize, particularly, carbon black and other finely divided materials which have been pretreated to densify or partially wet the material, also the same can be used to wet pelletize materials which have been subjected to operations adapted to degasify and deaerate the solids.

It is known to me that the pelletizing action occurs in the area at the inside periphery of the housing and that the effective work input applied to the black is dependent upon the peripheral speed of the pins. It is also known to me that the initial stage of degasing, wetting and pelletization of the black requires more work input than the final compaction and polishing steps. Excessive work input after initial pellet formation results in pellet breakage and reagglomeration into larger and less uniform pellets.

In operation, the apparatus of the present invention provides the additional volume required to accommodate the black in the condition it is introduced into the pelletizer at the upstream end and applies the maximum work to initially wet the black and form pellets. The present invention further provides the means for gradually reducing the work input as the initially formed wet pellets are moved through the apparatus thus avoiding the usual breakup and reagglomeration that occurs in the conventional pelletizer. The reduction of work input is achieved by the decreased pin tip speed resulting from the conical configuration of the housing. The use of an agitator means having a uniformly reduced diameter providing a tapered configuration eliminates the void area about the axis of the means and causes the mixture to be displaced to the area where the pelletizing action occurs. After the black is suitably pelletized in moving through the apparatus, the pellets are discharged from the apparatus and passed to a suitable drying means.

The present apparatus has the advantage of being adjustable to wet pelletize various grades of blacks, which require different pin and housing tolerances, without having to install several conventional pelletizers. This apparatus flexibility is accomplished by the agitator means adjustment, through the insertion or withdrawal within housing 10; thereby providing an all-purpose pelletizing apparatus.

Having thus described my invention, what I claim is set forth in the following section:

1. An apparatus for wet pelletizing finely divided solids comprising:
    a stationary truncated conical housing having a smooth inner surface and having its axis in a substantially horizontal position, said housing having centrally apertured end plates enclosing each end thereof;
    a solids inlet port in the upper side of said housing near the upstream end having the greater diameter;
    an outlet port in the lower side of said housing near the downstream end having the lesser diameter;
    at least one liquid spray port in the upper side of said housing near said upstream end;
    a rotatable agitator means extending coaxially through said housing and the apertures of said end plates; and
    drive means communicating with said agitator means for rotating said means.

2. The apparatus of claim 1 wherein the stationary truncated conical housing has at least one additive port and introduction means in the upper side thereof.

3. The apparatus of claim 1 having in addition to said conical housing an additional cylindrical section intermediate of at least one of said end plates and said housing with a diameter substantially equal to the diameter of the housing adjacent said section.

4. The apparatus of claim 1 wherein the rotatable agitator means comprises a coaxial member having a circular cross section and pins extending from said member into the area of the inner periphery of said stationary truncated conical housing.

5. The apparatus of claim 4 wherein said pins extend radially from said member and are arranged in a helical pattern over at least part of the length of said member with said pins having the outer portion beveled.

6. The apparatus of claim 4 wherein said coaxial member has a uniform diameter.

7. The apparatus of claim 4 wherein the coaxial member has a diameter of uniform variance over at least the upstream two-thirds of its length in conformed relationship to the diameter of said truncated conical housing.

8. The apparatus of claim 7 wherein said diameter of uniform variance occurs through about two-thirds of the length of said member from the upstream end thereof.

9. The apparatus of claim 7 wherein said coaxial member is a tapered shaft with increasing diameter towards the upstream end.

10. The apparatus of claim 4 wherein the coaxial member comprises a shaft of substantially uniform diameter throughout its length with a sleeve member affixed about said shaft, said sleeve member having a circular cross sectional area and a diameter of uniform variance over at least the upstream two-thirds of its length in conformed relationship to the diameter of said truncated conical housing.

11. The apparatus of claim 4 wherein the coaxial member is supported by an adjustable retaining means at each end.

References Cited

UNITED STATES PATENTS

| | | | |
|---|---|---|---|
| 735,664 | 8/1903 | Gent | 241—261X |
| 2,684,290 | 7/1954 | Alexander et al. | |
| 3,124,624 | 3/1964 | Berlien et al. | |
| 3,326,642 | 6/1967 | Ruble | 18—1X |
| 3,353,208 | 11/1967 | Fergus | 18—1 |

J. SPENCER OVERHOLSER, Primary Examiner

R. L. SPICER, JR., Assistant Examiner

U.S. Cl. X.R.

241—188; 264—117